UNITED STATES PATENT OFFICE.

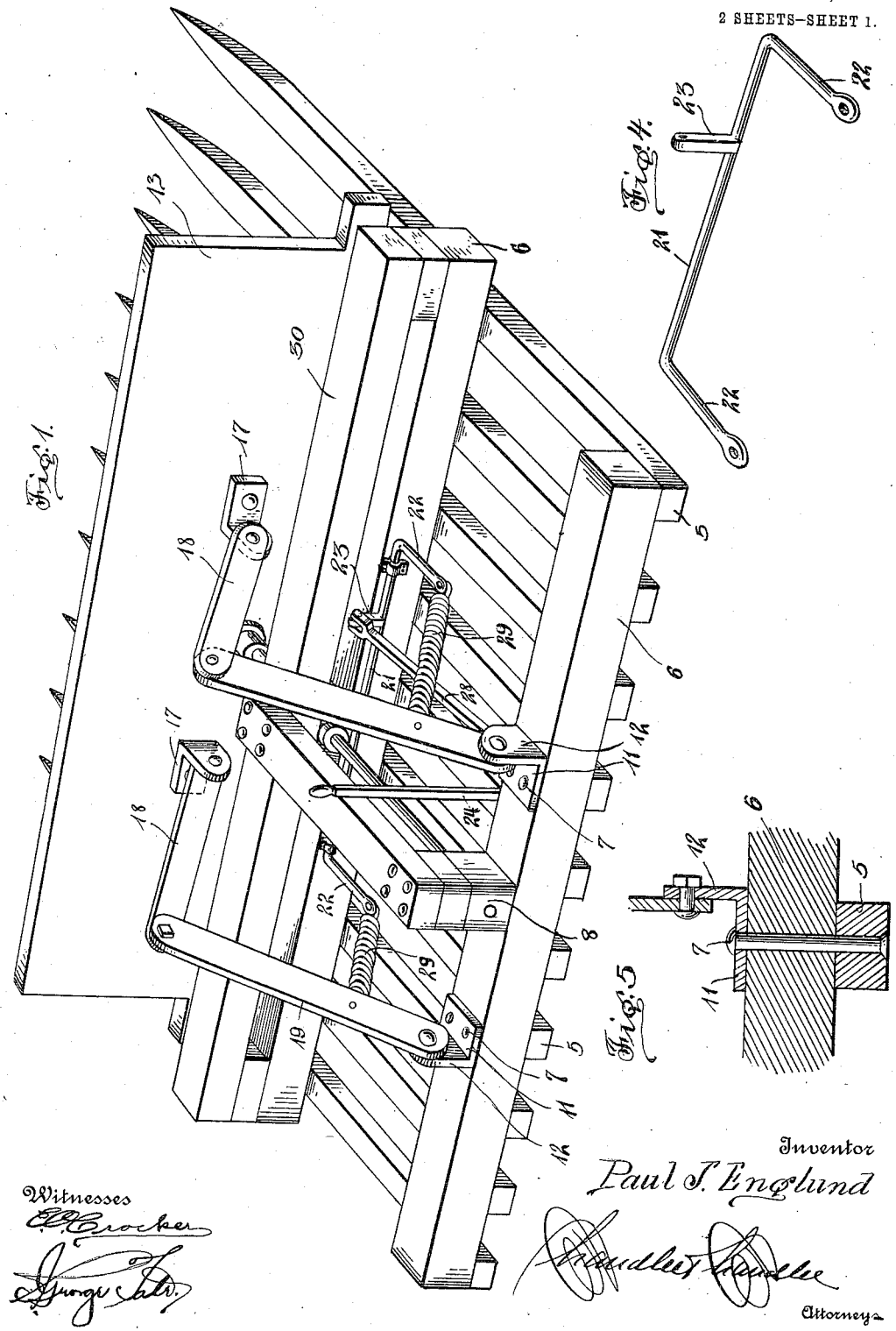

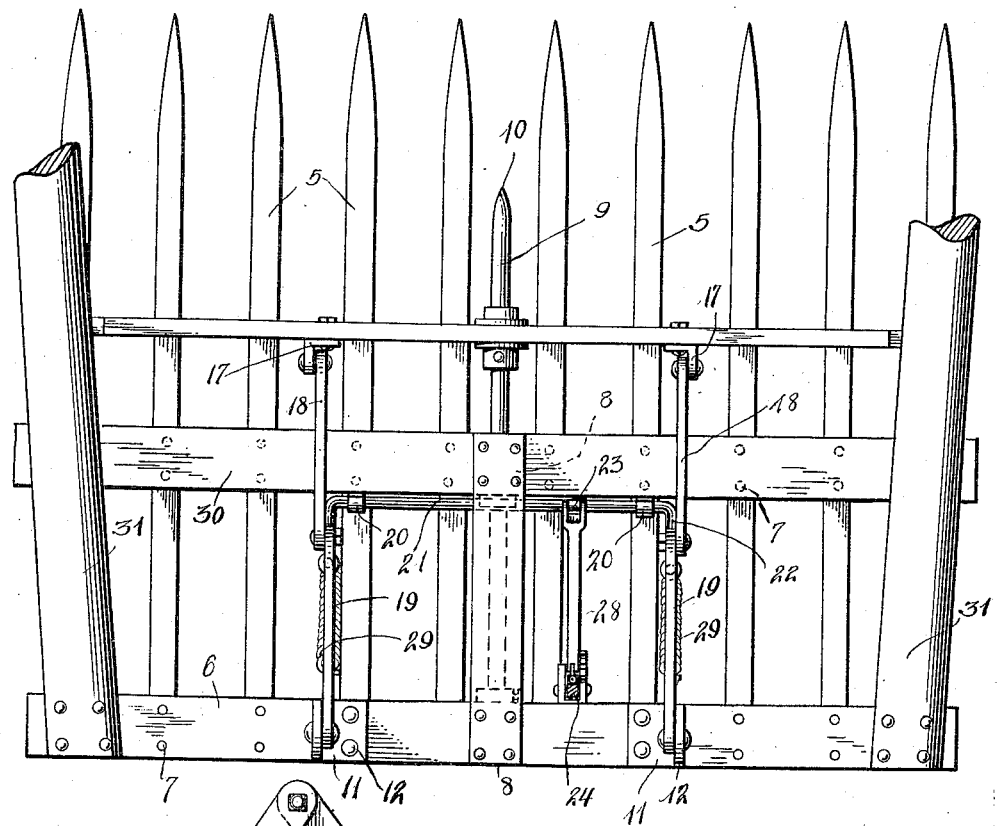
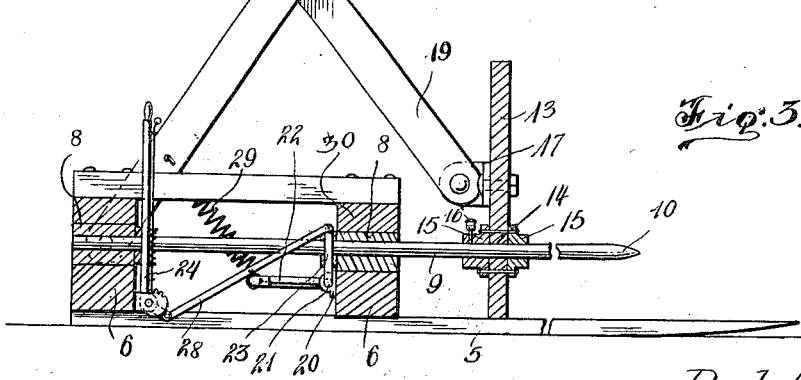

PAUL J. ENGLUND, OF FALUN, KANSAS.

PUSHER ATTACHMENT FOR SWEEP-RAKES.

1,030,292.   Specification of Letters Patent.   Patented June 25, 1912.

Application filed January 12, 1911. Serial No. 602,329.

*To all whom it may concern:*

Be it known that I, PAUL J. ENGLUND, a citizen of the United States, residing at Falun, in the county of Saline, State of Kansas, have invented certain new and useful Improvements in Pusher Attachments for Sweep-Rakes; and I do hereby declare the following to be a full, clear, and exact description of the invention, such as will enable others skilled in the art to which it appertains to make and use the same.

This invention relates to sweep-rakes generally, although the purpose of the invention more particularly is to provide an attachment thereto for discharging the grain from the rake.

In localities where hay is harvested in large quantities it is customary to store it in stacks which are built to a considerable height by means of stacking machines which are supplied with loads of hay or other grain for elevation into position on the stack by an implement known as a "sweep". The sweep is drawn or pushed over the field where the hay has been cut and cured and gathers the same by loads and this is transferred to the receiving tines of a stacker. It has been found in practice that when the sweep is being withdrawn from the stacker considerable quantities of hay remains on the sweep.

The principal object of my invention therefore is to provide an improved pushing attachment for the sweep, whereby all of the hay or other grain will be discharged.

Another object of the invention is to provide an attachment to any form of sweep now in common usage without any alteration to the said sweep.

A still further object of the invention is to provide an attachment which is composed of a minimum number of parts and is therefore simple in construction and cheap to manufacture.

With these and other objects in view, the invention consists in the construction and novel combination of parts hereinafter fully described, illustrated in the accompanying drawings, and pointed out in the claims, hereto appended; it being understood that various changes in the form, proportion, size and minor details of construction, within the scope of the claims, may be resorted to without departing from the spirit or sacrificing any of the advantages of the invention.

In the drawings:—Figure 1 is a detail perspective view of the rear end of a sweep showing my improved pusher attachment associated therewith, Fig. 2 is a top plan view thereof, Fig. 3 is a vertical transverse sectional view through the same, Fig. 4 is a perspective view of the rock shaft, and Fig. 5 is a detail sectional view through the sweep and one of the brackets.

Like reference numerals indicate corresponding parts throughout the several views.

Referring to the drawings the numerals 5 designate a plurality of rake teeth of ordinary construction. These teeth are spaced in parallel relation and are connected to transverse bars 6—6 by means of bolts 7 or other suitable fastening means. Centrally secured to the bars 6 are bearing blocks 8—8 which are disposed in alinement with each other for receiving a guide rod 9, the forward end 10 thereof being pointed and extending toward the front ends of the teeth 5. Secured to the rear bar 6 on either side of the bearing plate 8 are brackets 11 having upstanding ears 12 formed integral therewith. These brackets are secured to the bars by the bolts 7.

In order to remove the hay or other grain from the fork a pusher-board 13 is positioned transversely over the teeth in advance of the bars 6 and is centrally provided with an opening 14 and bearing-boxes 15—15 which are respectively positioned contiguous to the opening on either side of the board and adapted to receive a guide-rod 9. Secured to one of the guide-boxes 15 is an oil cup 16 by means of which the said guide-rod can be oiled. Secured to the rear face of the pusher-board 13 are spaced brackets 17—17 which are respectively disposed in alinement with the brackets 11 on the bar 6. Pivotally connected to each bracket 17 is one end of a link 18, the other end of said link being pivotally connected to a second link 19 which is in turn pivotally connected to the bracket 11.

In order to force the pusher-board 13 forwardly I have provided the following actuating means: Mounted on the forward transverse bar 6 intermediate the pairs of links 18 and 19 are spaced bearing-blocks 20 and rotatably mounted in these blocks is a rock shaft 21 which is bent at its ends to form normally laterally projecting rocker-arms 22. Extending upwardly from the rock-shaft 21 and rigidly secured thereto is a lever-arm 23 and said lever-arm is disposed in a plane at right angles to the plane of the rocker arms 22. A hand-lever 24 is mounted on the rear transverse bar 6, and pivotally connected thereto and to the lever-arm 23, is a link rod 28. Secured to the free end of each rocker arm 22 is one end of a coil-spring 29 and the other end of said coil-spring is connected to the lower end of the adjacent link 19 above the bracket 11.

From the foregoing it will be observed that when the hand-lever 24 is moved rearwardly the lever-arm 23 of the rock-shaft will also be moved in the same direction and as a result the rocker-arms 22 will be forced downwardly. As a result the tension of the coil-springs 29 will be caused and by this means the links 19 will be swung forwardly and thereby move the pusher-board toward the front end of the rake.

In order to limit the outward movement of the pusher-board I have provided a bar 30 which is secured to the front block 8 and disposed directly below the links 19. When the pusher-board has been moved forwardly the said links 19 will engage the said bar 30, and as a result the downward movement of the said links will be limited and consequently the movement of the pusher-board will also be limited. When this operation has been completed it will be observed that the coil-springs 29 have been extended and the grain which will be picked up by the fork in the next operation will be sufficient to return the said board to its normal position. Disposed on either side of the rake frame are longitudinal frame members 31—31, which are positioned upon the rear bar 6 and the bar 30 and on either end of the pusher board 13. These members 31 are designed to hold the hay from falling off the rake frame.

What is claimed is:—

1. In combination with a sweep rake including spaced transverse bars, of a centrally disposed guide-rod secured to said bars and projecting over the rake teeth, a pusher-board transversely disposed above the teeth and slidably mounted on the guide-bar, spaced links pivotally connected to the pusher-board, spaced links pivotally connected at one end to one of the bars and at their other ends to the free end of the first mentioned links, a rock-shaft rotatably mounted on the other of said bars and provided with projecting arms, coil springs respectively connecting the arms and one of the links, and means for operating said rock-shaft.

2. In combination with a sweep rake including spaced transverse bars, of a centrally disposed guide-rod secured to said bars and projecting over the rake teeth, a pusher-board transversely disposed above the teeth and slidably mounted on the guide-bar, spaced links pivotally connected to the pusher-board, spaced links pivotally connected at one end to one of the bars and at their other ends to the free end of the first mentioned links, a rock-shaft rotatably mounted on the other of said bars and provided with projecting arms, coil springs respectively connecting the arms and one of the links, a lever-arm secured to the rock-shaft, a hand lever, and a link connecting the lever-arm and the hand-lever.

In testimony whereof, I affix my signature, in presence of two witnesses.

PAUL J. ENGLUND.

Witnesses:
WALFRED JOHNSON,
JOHN ENGLUND.